(12) United States Patent
Lee

(10) Patent No.: US 11,217,841 B2
(45) Date of Patent: Jan. 4, 2022

(54) SYSTEM AND METHOD FOR THERMALLY MANAGING BATTERY

(71) Applicants: HYUNDAI MOTOR COMPANY, Seoul (KR); KIA MOTORS CORPORATION, Seoul (KR)

(72) Inventor: Gun Goo Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 138 days.

(21) Appl. No.: 16/422,362

(22) Filed: May 24, 2019

(65) Prior Publication Data

US 2019/0280356 A1 Sep. 12, 2019

Related U.S. Application Data

(62) Division of application No. 14/943,918, filed on Nov. 17, 2015, now abandoned.

(30) Foreign Application Priority Data

Jun. 17, 2015 (KR) .......................... 10-2015-0085755

(51) Int. Cl.
  *H01M 10/6572* (2014.01)
  *H01M 10/617* (2014.01)
  *H01M 10/625* (2014.01)
  *H01M 10/6563* (2014.01)

(52) U.S. Cl.
  CPC ..... *H01M 10/6572* (2015.04); *H01M 10/617* (2015.04); *H01M 10/625* (2015.04); *H01M 10/6563* (2015.04); *H01M 2220/20* (2013.01)

(58) Field of Classification Search
  None
  See application file for complete search history.

(56) References Cited

U.S. PATENT DOCUMENTS

| 2004/0135550 | A1 | 7/2004 | Nishihata |
| 2006/0110657 | A1 | 5/2006 | Stanton |
| 2007/0248876 | A1* | 10/2007 | Ahn ............... H01M 10/613 429/120 |
| 2013/0078495 | A1 | 3/2013 | Chiu |
| 2013/0183555 | A1* | 7/2013 | Boddakayala ...... H01M 10/647 429/72 |
| 2014/0090823 | A1 | 4/2014 | Moser |
| 2015/0101354 | A1* | 4/2015 | Oh ............... H01M 10/6572 62/3.2 |

(Continued)

FOREIGN PATENT DOCUMENTS

| JP | 2000-328981 A | 11/2000 |
| JP | 2013-084475 A | 5/2013 |

(Continued)

*Primary Examiner* — Haixia Zhang
(74) *Attorney, Agent, or Firm* — Lempia Summerfield Katz LLC

(57) ABSTRACT

A system and method for thermally managing a battery, capable of effectively performing thermal management (cooling or heating) of a battery is provided. The system for thermally managing a battery includes a thermal manager performing a thermal management of a battery by means of a coolant, a coolant circulation line being connected to the thermal manager, and a heat exchanger being installed to the coolant circulation line.

4 Claims, 12 Drawing Sheets

(56) References Cited

U.S. PATENT DOCUMENTS

2015/0244044 A1* 8/2015 Boddakayala ...... H01M 10/625
429/120

FOREIGN PATENT DOCUMENTS

| JP | 2014-103734 A | 6/2014 |
|---|---|---|
| KR | 10-2008-0037159 A | 4/2008 |
| KR | 10-2014-0143816 A | 12/2014 |

* cited by examiner

SYSTEM AND METHOD FOR THERMALLY MANAGING BATTERY

PRIORITY STATEMENT

This application is a divisional application of non-provisional U.S. patent application Ser. No. 14/943,918, filed on Nov. 17, 2015, now abandoned on Aug. 29, 2019, which claims the benefit of Korean Patent Application No. 10-2015-0085755, filed on Jun. 17, 2015, the entirety of each of which are hereby incorporated by reference.

FIELD

The present disclosure relates to a system and method for thermally managing a battery.

BACKGROUND

The statements in this section merely provide background information related to the present disclosure and may not constitute prior art.

Lithium batteries applied to hybrid electric vehicles (HEVs), plug-in hybrid electric vehicles (PHEVs), and electric vehicles (EVs) are advantageous in terms of output and energy density, compared with existing nickel-metal hydride (Ni-MH) batteries.

However, when lithium batteries are charged or discharged, heat is generated, and thus, in a high temperature environment such a scorching summer, ambient heat may be added to heat generated when a lithium battery is used, reducing a lifespan of the lithium battery. Also, in a low temperature environment such as a cold weather condition, a temperature of a lithium battery is lowered more than necessary, degrading an output of the lithium battery.

Thermal management of a battery is important to prevent a degradation of a lifespan and an output.

In general, in order to cool a high voltage battery system, an air cooling-type cooling system for forcibly blowing air toward a battery by means of a cooling fan or a water cooling-type cooling system using water or oil is used. Also, in an extremely low temperature environment, a battery heating system for heating a battery using a heater core, a surface type heater is applied.

In particular, in a PHEV or EV requiring a high output, heat having a high temperature is generated in a lithium battery, and as a result, a water cooling-type cooling system is increasingly applied.

However, the water cooling-type cooling system has a very complicated structure for excellent cooling performance. For example, the existing water cooling-type cooling system is associated with a vehicle air-conditioning system, resulting in a very complicated overall structure, and thus, it is required to check an overall layout and performance of the existing water cooling-type cooling system in respect to a vehicle air-conditioning system when designed.

SUMMARY

The present disclosure provides a system and method for thermally managing a battery capable of simplifying an overall layout by unifying a cooling system and a heating system without the necessity of associating with a vehicle air-conditioning system, and considerably improving cooling and heating efficiency of a battery by effectively cooling or heating a coolant heat-exchanged with a battery using the Peltier effect of a thermoelectric element.

According to an exemplary form of the present disclosure, a system for thermally managing a battery includes: a thermal manager performing a thermal management of a battery by means of a coolant; a coolant circulation line being connected to the thermal manager; and a heat exchanger being installed to the coolant circulation line.

The heat exchanger may include: a heat exchange member being installed to the coolant circulation line to cool or heat the coolant; a thermoelectric element being attached to the heat exchange member; and a heat sink being attached to the thermoelectric element.

A pair of thermoelectric elements may be symmetrically attached to the heat exchange member and a pair of heat sinks may be attached to the thermoelectric elements such that the pair of heat sinks may be symmetrically disposed with respect to the heat exchange member.

The thermoelectric element may have a first surface in contact with the heat exchange member and a second surface in contact with the heat sink, and a polarity change switch changing polarity may be connected to the thermoelectric element.

The system may further include: a first temperature sensor being installed to the battery to detect a temperature of the battery, and a second temperature sensor being installed to the coolant circulation line to detect a temperature of the coolant.

The system may further include: a cooling fan being disposed to face the heat sink.

The heat exchange member may include a plurality of heat exchange plates being spaced apart from one another at a predetermined interval, and a heat exchange tube penetrating through the plurality of heat exchange plates, and the coolant moves through the heat exchange tube.

The heat exchange tube may be a straight tube.

In one form, a plurality of inner fins are formed on an inner surface of the heat exchange tube.

The heat exchange member may include a serpentine heat exchange tube being connected to the coolant circulation line and a heat exchange block covering an outer surface of the serpentine heat exchange tube.

The heat exchange member may include a heat exchange duct being connected to the coolant circulation line, and a grid frame in which a plurality of grid flow channels are formed at a uniform interval may be installed inside the heat exchange duct.

The heat exchange duct may have an inlet, through which a coolant is introduced, and an outlet, through which the coolant is discharged, formed at both end portions thereof, and may have a structure bent to have a U shape.

The inlet and the outlet of the heat exchange duct may have a cross-sectional area smaller than that of the heat exchange duct, and the inlet and the outlet may be connected to one end and the other end of the heat exchange duct by the medium of expansion type connection portions.

A baffle having a plurality of small through holes may be installed within the expansion type connection portions.

According to another exemplary form of the present disclosure, a system for thermally managing a battery includes: a thermal manager allowing a coolant to flow therein to cool or heat a battery and having an inlet through which the coolant is introduced and an outlet through which the coolant is discharged; a coolant circulation line connecting the inlet and the outlet of the thermal manager; a coolant circulation pump pumping the coolant to the thermal manager; and a heat exchanger having a thermoelectric element being installed to the coolant circulation line to cool or heat the coolant by changing polarity.

The battery may be a battery installed in any one of a hybrid electric vehicle (HEV), a plug-in hybrid electric vehicle (PHEV), a fuel cell electric vehicle (FCEV), and an electric vehicle (EV).

According to another exemplary form of the present disclosure, a method of thermally managing a battery including a thermal manager having a coolant which exchanges heat with a battery and flows in the thermal manager, a coolant circulation line being connected to the thermal manager, and a heat exchanger being installed to the coolant circulation line, having a thermoelectric element, and cooling or heating the coolant by changing polarity, comprises measuring a temperature of the battery; performing selectively a cooling operation of the thermoelectric element to cool the coolant when the measured temperature of the battery exceeds an upper limit threshold value of the battery; and performing selectively a heating operation of the thermoelectric element to heat the coolant when the measured temperature of the battery is lower than a lower limit threshold value of the battery.

A temperature of the battery and a temperature of the coolant may be measured, and when the measured temperature of the battery exceeds the upper limit threshold value of the battery and the measured temperature of the coolant is lower than that of the battery, the coolant may be cooled by a cooling operation of the thermoelectric element and the coolant may be pumped to the thermal manager.

A temperature of the battery and a temperature of the coolant may be measured, and when the measured temperature of the battery exceeds the upper limit threshold value of the battery and the measured temperature of the coolant is higher than that of the battery, pumping the coolant to the thermal manager may be interrupted and the coolant may be cooled by a cooling operation of the thermoelectric element.

A temperature of the battery and a temperature of the coolant may be measured, and when the measured temperature of the battery is lower than a lower limit threshold value of the battery and the measured temperature of the coolant is higher than that of the battery, the coolant may be heated by a heating operation of the thermoelectric element and the coolant may be pumped to the thermal manager.

A temperature of the battery and a temperature of the coolant may be measured, and when the measured temperature of the battery is lower than the lower limit threshold value of the battery and the measured temperature of the coolant is lower than that of the battery, pumping the coolant to the thermal manager may be interrupted and the coolant may be heated by a heating operation of the thermoelectric element.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 2:
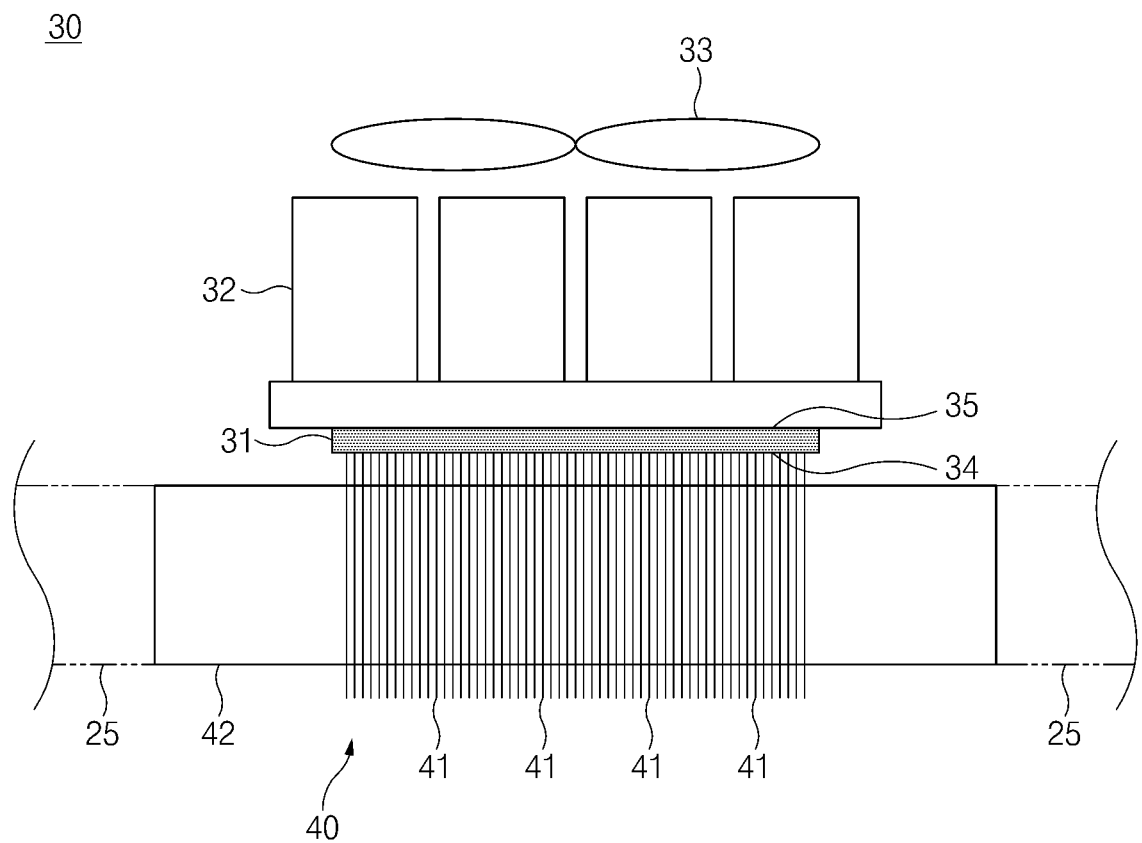
FIG. 2 is a side view illustrating a heat exchanger according to a first form applied to a system for thermally managing a battery of the present disclosure.
Figure 4A:
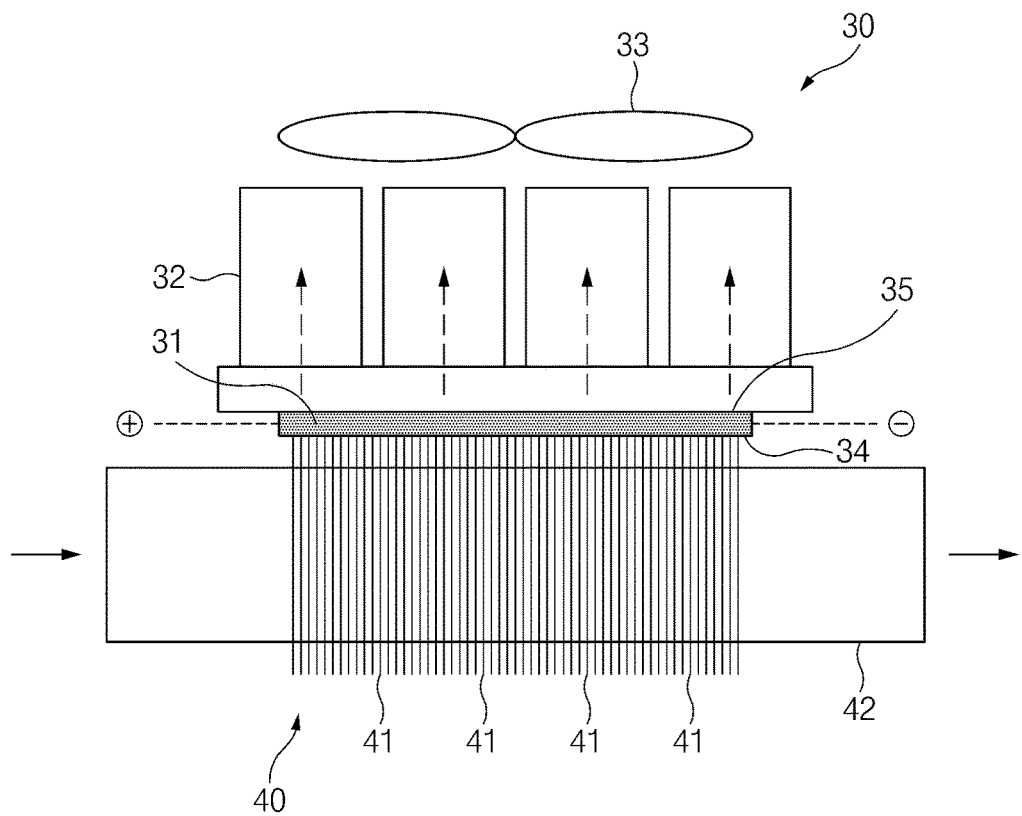
Figure 4B:
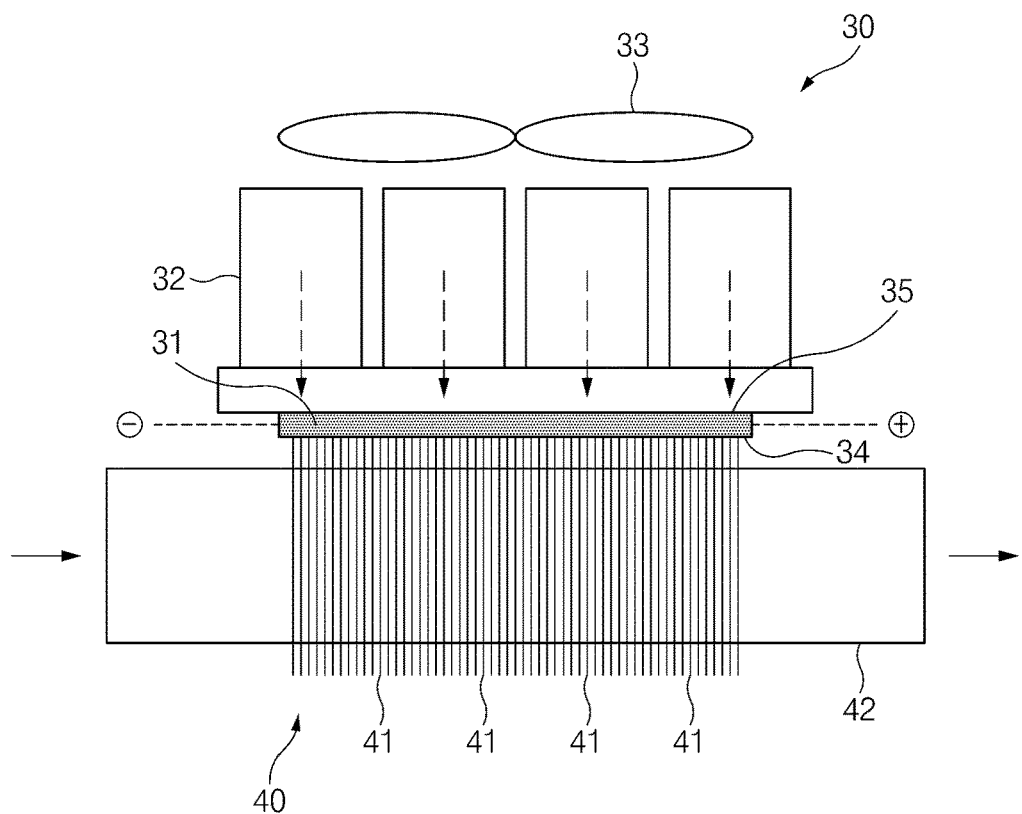
Figure 5:
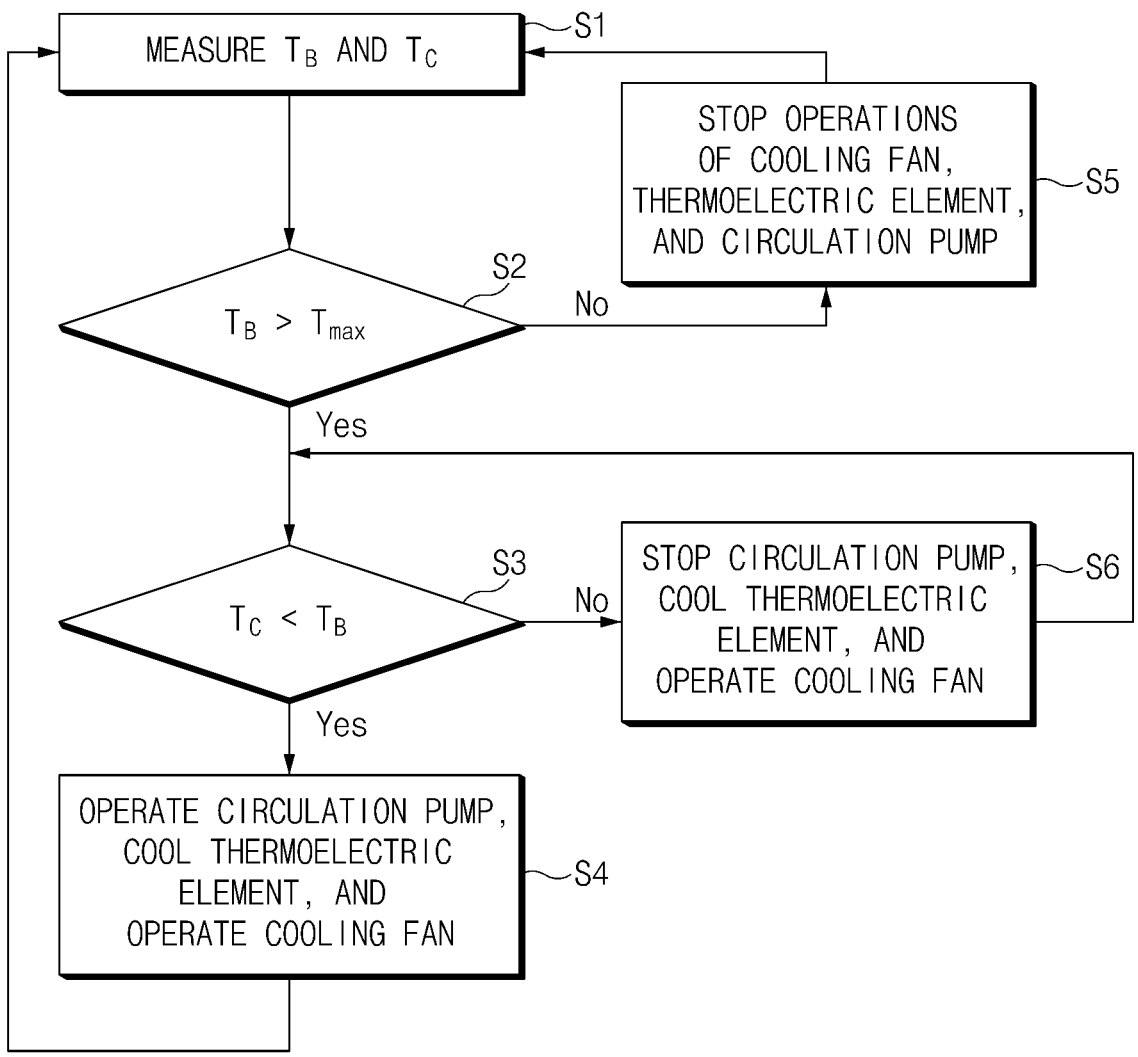
Figure 6:
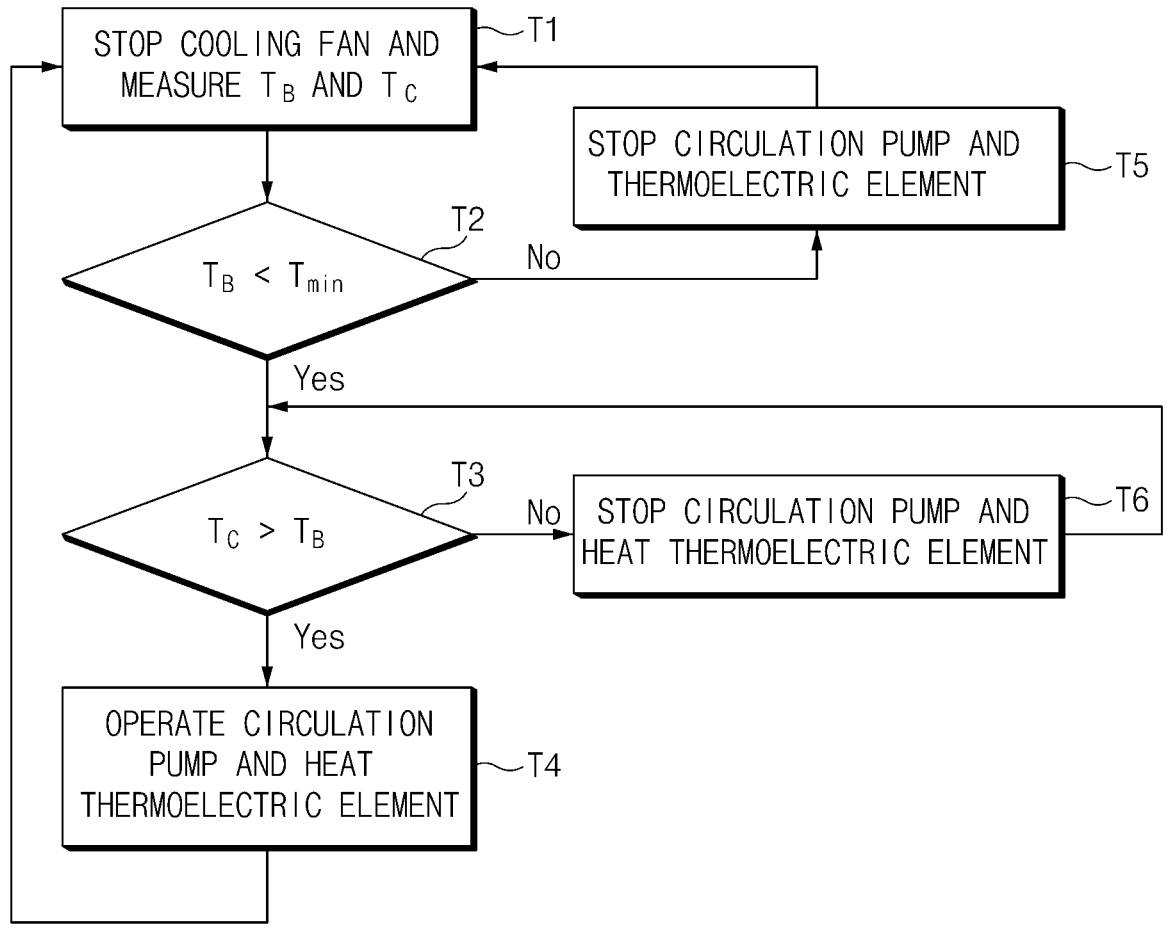
Figure 7:
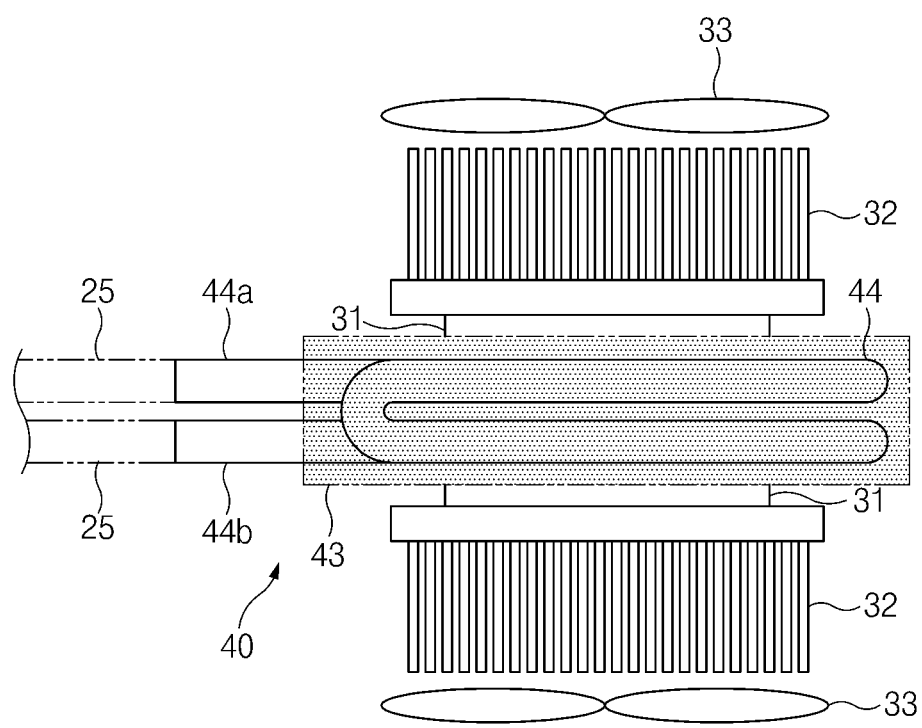
Figure 8:
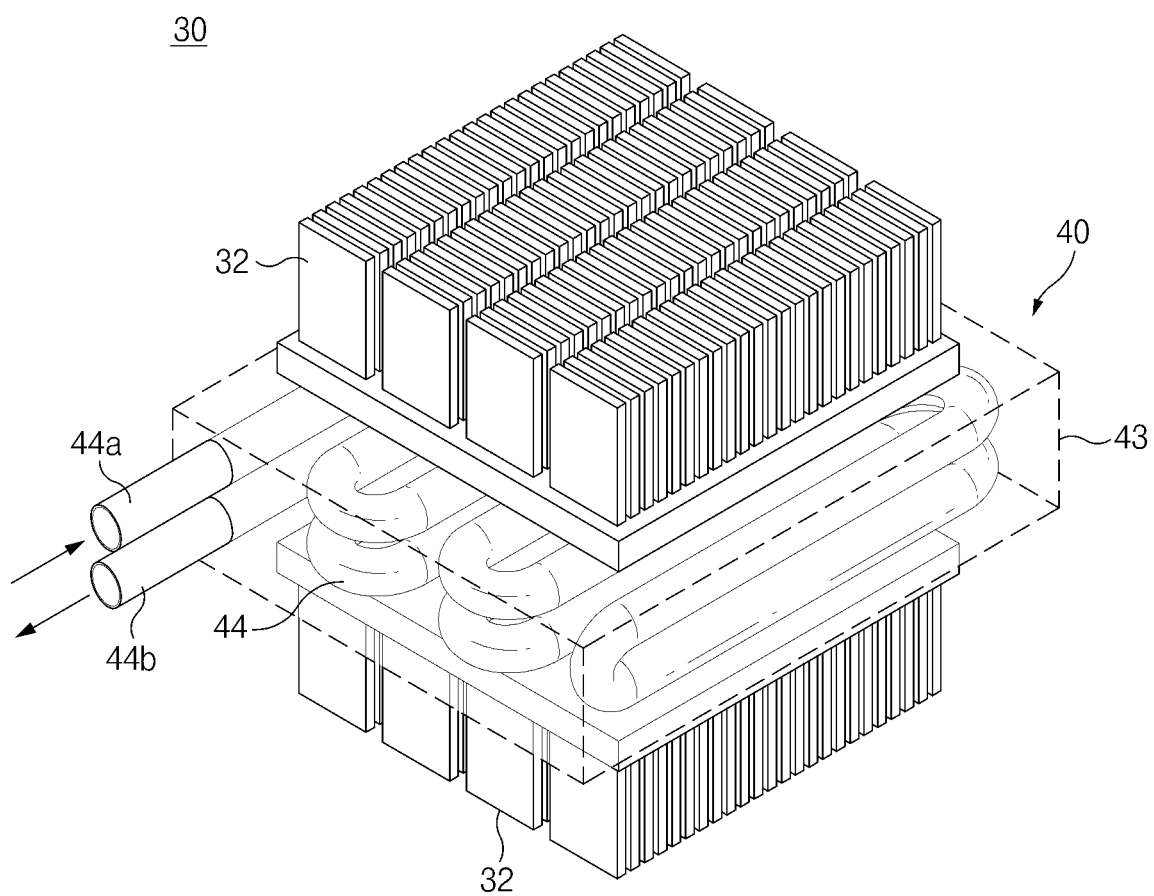
Figure 9:
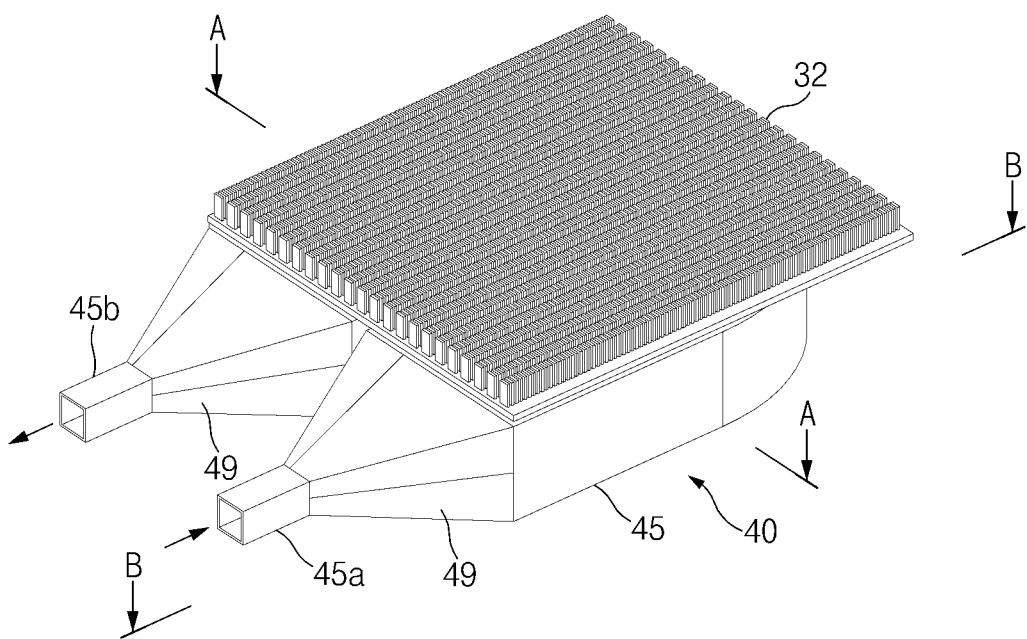
Figure 10:
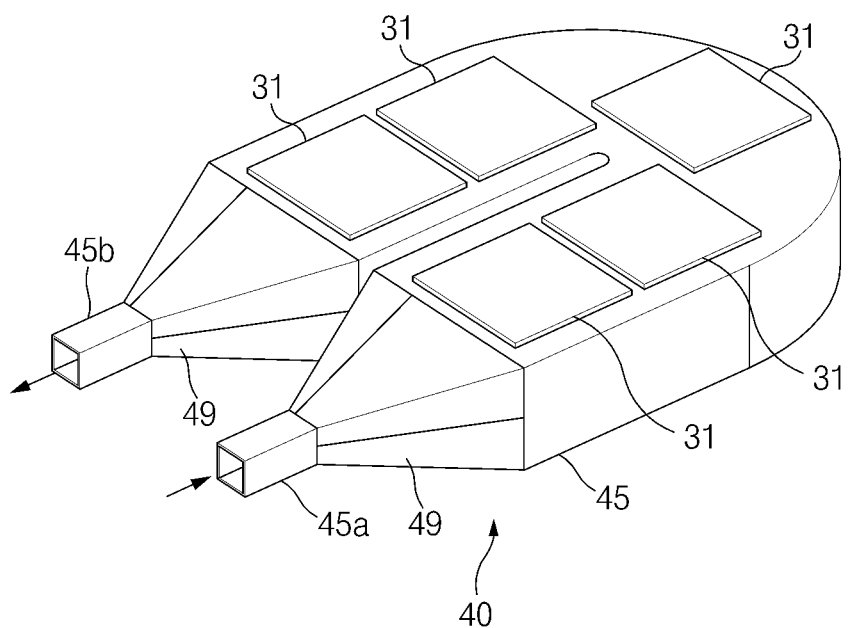
Figure 11:
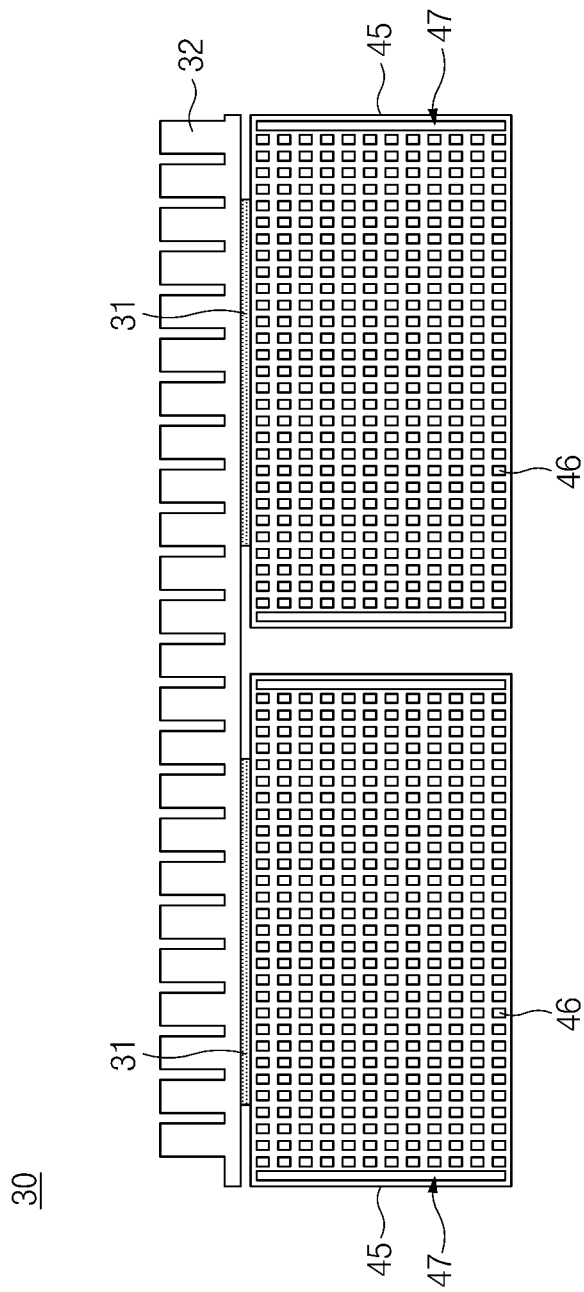

FIGS. 4A and 4B are views illustrating a state in which a thermoelectric element of a heat exchanger cools or heats a coolant by converting polarity according to the first exemplary form of the present disclosure of FIG. 2, wherein FIG. 4A is a view illustrating a state in which a coolant is cooled by the thermoelectric element and FIG. 4B is a view illustrating a state in which a coolant is heated by the thermoelectric element;

FIG. 5 is a flow chart illustrating a cooling logic in a method for thermally managing a battery according to an exemplary form of the present disclosure;

FIG. 6 is a flow chart illustrating a heating logic in the method for thermally managing a battery according to an exemplary form of the present disclosure;

FIG. 7 is a side view illustrating a heat exchanger according to a second exemplary form of the present disclosure applied to a system for thermally managing a battery of the present disclosure;

FIG. 8 is a perspective view illustrating a heat exchanger according to the second exemplary form of FIG. 7;

FIG. 9 is a perspective view illustrating a heat exchanger according to a third exemplary form of the present disclosure applied to a system for thermally managing a battery of the present disclosure;

FIG. 10 is a perspective view illustrating a state in which a heat sink and a cooling pan are removed from the heat exchanger according to the third exemplary form of FIG. 9;

FIG. 11 is a cross-sectional view taken along line A-A of FIG. 9; and

Figure 12:
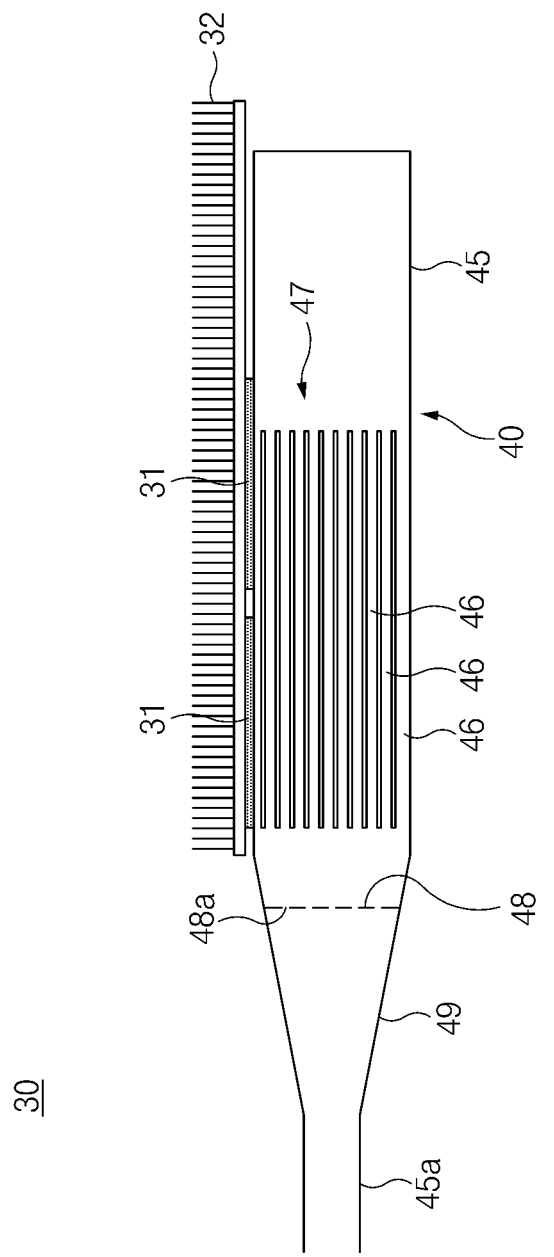

FIG. 12 is a cross-sectional view taken along line B-B of FIG. 9.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For reference, the sizes of elements or thicknesses of lines illustrated in the drawings may be exaggeratedly illustrated for convenience of description. Moreover, the terms used henceforth have been defined in consideration of the functions of the present disclosure, and may be altered according to the intent of a user or operator, or conventional practice. Therefore, the terms should be defined on the basis of the entire content of this specification.

FIGS. 1 through 4A and 4B are views illustrating a system for thermally managing a battery according to an exemplary form of the present disclosure.

Referring to FIGS. 1 through 4A and 4B, a system for thermally managing a battery according to an exemplary form of the present disclosure includes a thermal manager 20 performing thermal management on a battery 10, a coolant circulation line 25 connected to the thermal manager 20, and a heat exchanger 30 installed to the coolant circulation line 25.

The thermal manager 20 is in contact with a battery 10 and has a coolant flowing circuit (not shown) therein. Thus, a coolant flowing in the coolant flowing circuit of the thermal manager 20 may exchange heat with the battery 10 to cool or heat the battery 10, thereby appropriately performing thermal management on the battery 10. For example, accommodating a flow of a coolant therein, the thermal manager 20 in contact with the battery 10 allows the coolant to exchange heat with the battery 10, thus performing thermal management on the battery 10.

According to an exemplary form, the thermal manager 20 may be configured as a thermal jacket having a coolant flowing circuit therein. Such a coolant flowing circuit (not shown) may have a structure such as a serpentine flow path, or the like.

Here, the battery 10 may be a battery installed in any one of a hybrid electric vehicle (HEV), a plug-in hybrid electric vehicle (PHEV), and a fuel cell electric vehicle (FCEV), and an electric vehicle (EV).

The thermal manager 20 may have an inlet 21 through which a coolant is introduced and an outlet 22 through which the coolant is discharged, and the inlet 21 and the outlet 22 communicate with the coolant flowing circuit (not shown).

The coolant circulation line 25 connects the inlet 21 and the outlet 22 of the thermal manager 20, and through the coolant circulation line 25, a coolant may be introduced through the inlet 21 of the thermal manager 20, exchange heat with the battery 10, and subsequently discharged to the outlet 22 of the thermal manager 20.

A coolant circulation pump 26 pumping a coolant toward the inlet 21 of the thermal manager 20 is installed to the coolant circulation line 25.

The heat exchanger 30 is installed on one side of the coolant circulation line 25, and particularly, the heat exchanger 30 may be disposed to be adjacent to the outlet 22 of the thermal manager 20 or may be disposed in the middle portion between the outlet 22 and the inlet 21 of the thermal manager 20.

Figure 3:
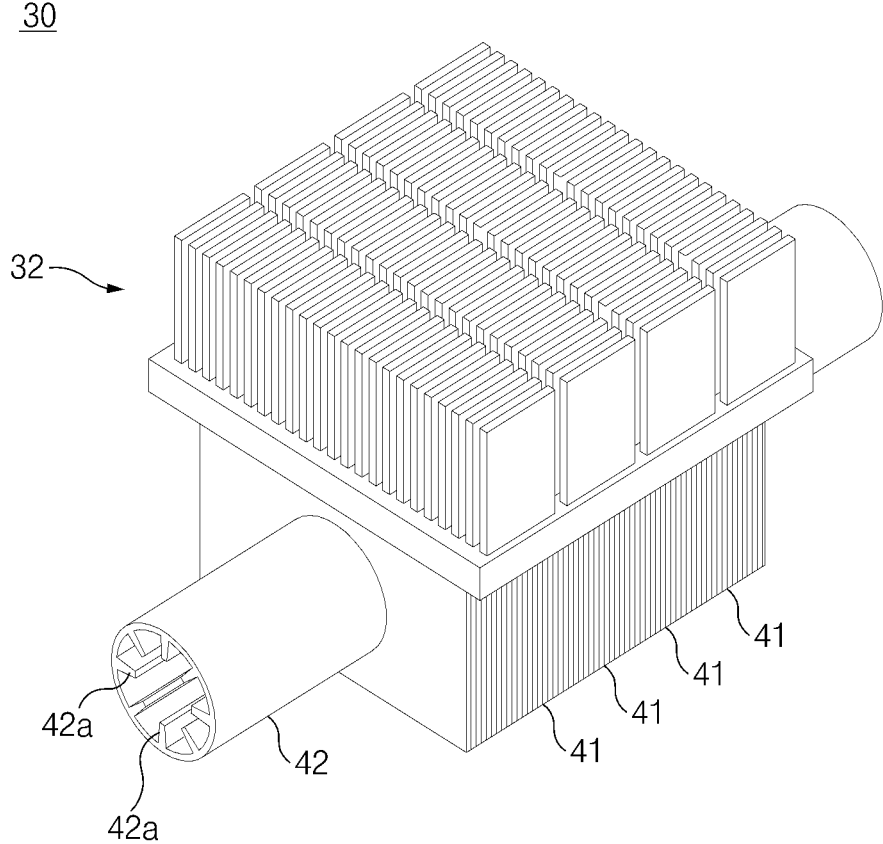
FIG. 3 is a perspective view illustrating a heat exchanger (without a cooling pan) according to a first exemplary form of the present disclosure of FIG. 2.

As illustrated in FIGS. 2 and 3, the heat exchanger 30 according to the first exemplary form of the present disclosure includes a heat exchange member 40 installed to the coolant circulation line 25, a thermoelectric element 31 attached to the heat exchange member 40, a heat sink 32 attached to the thermoelectric element 31, and a cooling fan 33 disposed to face the heat sink 32.

The heat exchange member 40 includes a plurality of heat exchanging plates 41 being spaced apart from one another by a predetermined small interval and a heat exchange tube 42 penetrating through the plurality of heat exchanging plates 41.

The plurality of heat exchanging plates 41 are disposed to be spaced apart from one another by a predetermined interval in the direction of moving a coolant.

A flow path along which a coolant moves is formed within the heat exchange tube 42. According to an exemplary form, the heat exchange tube 42 may be formed as a straight tube penetrating through the plurality of heat exchanging plates 41 in a linear direction.

A plurality of inner fins 42a may be formed on an inner surface of the heat exchange tube 42, and increase a contact area of a coolant when the coolant moves through the heat exchange tube 42 to further enhance heat exchanging efficiency.

The heat exchange tube 42 may be manufactured separately from the coolant circulation line 25 and hermetically connected to the coolant circulation line 25 at both ends thereof. In one form, the heat exchange tube 42 may be integrally formed with the coolant circulation line 25.

The thermoelectric element 31 may be attached to one side of the heat exchange member 40. In particular, the thermoelectric element 31 may be attached to the top of the heat exchanging plates 41 of the heat exchange member 40.

The thermoelectric element 31 may have a first surface 34 in direct contact with the heat exchange member 40 and a second surface 35 in contact with the heat sink 32, and configured to perform a cooling operation and a heating operation on a coolant passing through the heat exchange member 40 using a Peltier effect.

Figure 1:
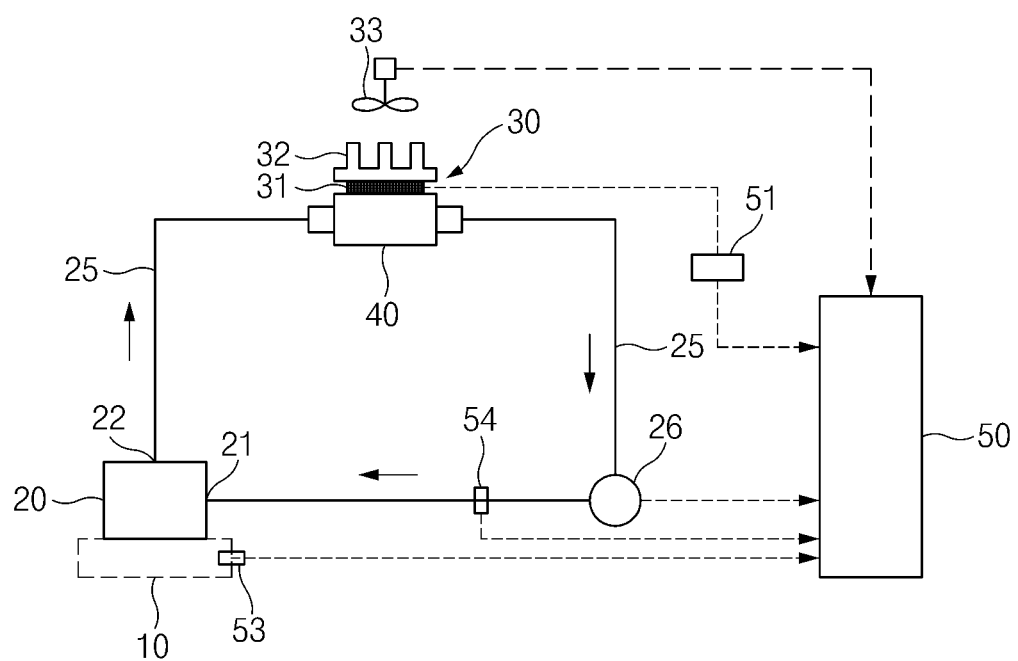
FIG. 1 is a view illustrating a configuration of a system for thermally managing a battery according to an exemplary form of the present disclosure.

As illustrated in FIG. 1, a polarity changing switch 51 changing polarity is connected to the thermoelectric element 30. The thermoelectric element 31 removes heat from the heat exchange member 40 to cool a coolant or transmits heat to the heat exchange member 40 to heat the coolant by the polarity change.

The heat sink 32 is attached to the second surface 35 of the thermoelectric element 31 to outwardly dissipate heat transmitted from the thermoelectric element 31 (cooling operation of the thermoelectric element 31) or to transmit ambient heat to the thermoelectric element 31 (heating operation of the thermoelectric element 31).

The cooling fan 33 is disposed to face the heat sink 32. The cooling fan 33 is configured to operate to forcibly blow cooling air to the heat sink 32 when a coolant is to be cooled through a cooling operation of the thermoelectric element 31, and stop operation when the coolant is to be heated through a heating operation of the thermoelectric element 31.

The cooling operation and heating operation of the thermoelectric element 31 will be described in detail with reference to FIGS. 4A and 4B.

First, a cooling operation of the thermoelectric element 31 may be performed to decrease a temperature of the coolant in order to more effectively cool the battery 20 when the battery 20 is overheated by an ambient environment and/or during charging or discharging. To this end, when polarity of the thermoelectric element 31 is connected as illustrated in FIG. 4A, an endothermic reaction occurs on the first surface 34 of the thermoelectric element 31 and an exothermic reaction occurs on the second surface 35 of the thermoelectric element 31. Accordingly, heat of the coolant passing through the heat exchange member 40 is absorbed to the first surface 34 of the thermoelectric element 31 and subsequently released from the second surface 35, and thereafter, dissipated through the heat sink 32, whereby the coolant moving through the heat exchange member 40 is cooled, and the coolant cooled thusly may be introduced to the thermal manager 20 so as to be exchange heat with the battery 10 to cool the battery 10. In particular, heat dissipation efficiency may be further increased through the operation of the cooling fan 33.

A heating operation of the thermoelectric element 31 may be performed to increase a temperature of the coolant in order to effectively heat the battery 20 in a low temperature environment or the like. To this end, when polarity of the thermoelectric element 31 is changed to be opposite to that of the case of FIG. 4A as illustrated in FIG. 4B, an exothermic reaction occurs on the first surface 32 of the thermoelectric element 31 and an endothermic reaction occurs on the second surface 35 of the thermoelectric element 31. Accordingly, ambient heat may be absorbed to the second surface 35 of the thermoelectric element 31 through the heat sink 32 and subsequently released from the first surface 34 of the thermoelectric element 31, and thereafter, the released heat is transmitted to the heat exchange member 40, whereby a coolant moving through the heat exchange member 40 is heated, and the coolant heated thusly is introduced to the thermal manager 20 so as to be heat-exchanged with the battery 10 to heat the battery 10. At this time, the operation of the cooling fan 33 is stopped.

A controller 50 controlling operations of the polarity change switch 51, the coolant circulation pump 26, and the cooling fan 33 is provided.

A first temperature sensor 53 detecting a temperature TB of the battery 10 is installed in the battery, and a second temperature sensor 54 detecting a temperature TC of the coolant is installed in the middle of the coolant circulation line 25.

According to an exemplary form, the second temperature sensor 54 is installed to be in the proximity of the inlet 21 of the thermal manager 20 in the coolant circulation line 25, to precisely extract a correlation between the temperature TB of the battery 10 and the temperature TC of the coolant, whereby the battery 10 may be effectively cooled or heated.

The controller 50 is connected to the first and second temperature sensors 53 and 54, and the temperature TB of the battery 10 detected by the first and second temperature sensors 53 and 54 and the temperature TC of the coolant are transmitted to the controller 50. By applying the information such as the temperature TB of the battery 10 and the temperature TC of the coolant to a predetermined cooling logic or heating logic, the controller 50 may appropriately control cooling or heating of the coolant by the thermoelectric element 31.

FIGS. 5 and 6 are views illustrating a method for thermally managing a battery.

According to the method for thermally managing a battery according to an exemplary form of the present disclosure, a temperature TB of the battery 10 and a temperature TC of a coolant are measured by the first and second temperature sensors 53 and 54. When the temperature TB of the battery 10 exceeds an upper limit threshold value (Tmax) of the battery 10 (overheated state of the battery 10), the thermoelectric element 31 performs a cooling operation to cool the coolant moving through the heat exchange member 40 of the heat exchanger 30 as illustrated in FIG. 5, and when the temperature TB of the battery 10 is less than a lower limit threshold value (Tmin) of the battery 10 (overcooled state of the battery 10), the thermoelectric element 31 performs a heating operation to heat the coolant moving through the heat exchange member 40 of the heat exchanger 30 as illustrated in FIG. 6.

That is, in the method for thermally managing a battery according to an exemplary form, the cooling and heating operation of the thermoelectric element 31 is selectively switched according to an overheated or overcooled state of the battery 10 to cool or heat the coolant heat-exchanged with the battery 10, thereby effectively cooling or heating the battery 10.

FIG. 5 is a flow chart illustrating a battery cooling logic according to an exemplary form.

First, a temperature TB of the battery 10 and a temperature TC of a coolant TC are measured by the first and second temperature sensors 53 and 54 in step S1, and it is determined whether the temperature TB of the battery 10 exceeds the upper limit threshold value (Tmax) of the battery 10 in step S2. Here, the upper limit threshold value (Tmax) is an allowable uppermost value of the battery 10 not disrupting driving of the battery 10.

Here, when the temperature TB of the battery 10 exceeds the upper limit threshold value (Tmax) of the battery 10, the battery 10 is in an overheated state, so the battery 10 is required to be cooled. When the temperature TB of the battery 10 does not exceed the upper limit threshold value (Tmax), the battery 10 is not required to be cooled, and thus, operations of the cooling fan 33, the thermoelectric element 31, and the coolant circulation pump 26 are stopped in step S5.

When it is determined that the temperature TB of the battery 10 exceeds the upper limit threshold value (Tmax) of the battery 10 in step S2, it is determined whether the temperature Tc of the coolant is lower than the temperature TB of the battery 10 in step S3.

Thereafter, when it is determined that the temperature TC of the coolant is lower than the temperature TB in step S3, the thermoelectric element 31 is cooled and the coolant circulation pump 25 and the cooling fan 33 are operated to cool the battery 10 in step S4. Accordingly, the coolant is cooled through the cooling operation of the thermoelectric element 31 and the operation of the cooling fan 33, and the cooled coolant is pumped to the thermal manager 20 by an operation of the coolant circulation pump 25 to cool the battery 10.

After step S4, the process is returned to step S1 to repeat the foregoing process.

When it is determined that the temperature TC of the coolant is higher than the temperature TB of the battery 10, the operation of the coolant circulation pump 25 is stopped to interrupt pumping of the coolant to the thermal manager 20, and the thermoelectric element 31 is cooled and the cooling fan 33 is operated in step S6. Accordingly, since the coolant circulation pump 25 is stopped, the coolant having a high temperature is not introduced to the thermal manager 20 and is cooled through the cooling operation of the thermoelectric element 31 and the operation of the cooling fan 33. After step S6, the process is returned to step S3.

FIG. 6 is a flow chart illustrating a method for heating a battery according to an exemplary form of the present disclosure.

First, in a state in which the cooling fan 33 is stopped, a temperature TB of the battery 10 and a temperature TC of a coolant are measured by the first and second temperature sensors 53 and 54 in step T1 and it is determined whether the temperature TB of the battery 10 is lower than a lower limit threshold value Tmin of the battery 10 in step T2. Here, the lower limit threshold value Tmin is an allowable lowermost value of the battery 10 not disrupting driving of the battery 10.

Here, when it is determined that the temperature TB of the battery 10 is lower than lower limit threshold value Tmin of the battery 10, it means that the battery 10 is in an overcooled state, and thus, the battery 10 is required to be heated. When it is determined that the temperature TB of the battery 10 is higher than lower limit threshold value Tmin of the battery 10, the battery 10 is not required to be heated, and thus, operations of the thermoelectric element 31 and the coolant circulation pump 26 are stopped in step T5.

When it is determined that the temperature TB of the battery 10 is lower than the lower limit threshold value Tmin of the battery 10 in step T2, it is determined whether the temperature TC of the coolant is higher than the temperature TB of the battery 10 in step T3.

Thereafter, when it is determined that the temperature TC of the coolant is higher than the temperature TB of the battery 10 in step T3, the coolant circulation pump 25 is operated and the thermoelectric element 31 is heated to heat the battery 10 in step T4. Accordingly, the coolant is heated through the heating operation of the thermoelectric element 31 and the operation of the cooling fan 33, and the coolant heated thusly is pumped to the thermal manager 20 through the operation of the coolant circulation pump 25 to heat the battery 10.

After step T4, the process is returned to step T1 to repeat the foregoing process.

When it is determined that the temperature TC of the coolant is lower than the temperature TB of the battery 10 in step S3, the operation of the coolant circulation pump 25 is stopped to prevent the coolant from being introduced to the inlet 21 of the thermal manager 20 and a heating operation of the thermoelectric element 31 is performed in step T6. Accordingly, since the coolant circulation pump 25 is stopped, the coolant having a low temperature is prevented from being pumped to the thermal manager 20 and heated through the heating operation of the thermoelectric element 31. After step T6, the process is returned to step T3.

FIGS. 7 and 8 illustrate a heat exchanger 30 according to a second exemplary form applied to a system for thermally managing a battery of the present disclosure.

The heat exchanger 30 according to the second exemplary form includes a heat exchange member 40 installed in the middle of the coolant circulation line 25 to exchange heat with a coolant, a thermoelectric element 31 attached to the heat exchange member 40, a heat sink 32 attached to the thermoelectric element 31, and a cooling fan 33 disposed to face the heat sink 32.

The heat exchange member 40 includes a serpentine heat exchange tube 44 connected to the coolant circulation line 25 and a heat exchange block 43 provided to cover an outer surface of the serpentine heat exchange tube 44.

The serpentine heat exchange tube 44 is formed to have a serpentine shape bent/changing directions several times to increase a contact area of a coolant to enhance heat exchange efficiency.

An inlet 44a through which the coolant is introduced and an outlet 44b through which the coolant is discharged are formed at both ends of the serpentine heat exchange tube 44, and the inlet 44a and the outlet 44b of the serpentine heat exchange tube are connected to the coolant circulation line 25.

The serpentine heat exchange tube 44 may be manufactured separately from the coolant circulation line 25 and hermetically connected to the coolant circulation line 25 at both ends thereof. In one form, the serpentine heat exchange tube 44 may be integrally formed with the coolant circulation line 25.

Also, inner fins (not shown) may be provided on an inner surface of the serpentine heat exchange tube 44 to further increase the contact area of the coolant.

The heat exchange block 43 is installed to cover an outer side of the serpentine heat exchange tube 44, and in particular, the heat exchange block 43 may be formed of a material having high heat transfer coefficient to facilitate heat exchange.

The thermoelectric element 31 may be attached to one side of the heat exchange member 40, and in particular, the thermoelectric element 31 may be attached to the heat exchange block 43 of the heat exchange member 40.

In the heat exchanger 30 according to the second exemplary form, a pair of thermoelectric elements 31 are symmetrically attached to upper and lower surfaces of the heat exchange block 43, and a pair of heat sinks 32 and a pair of cooling fans 33 are attached to the pair of thermoelectric elements 31 to correspond thereto, respectively, forming a symmetrical disposition with respect to the heat exchange block 43.

In this manner, since the pair of thermoelectric elements 31, the pair of heat sinks 32, and the pair of cooling fans 33 are symmetrically disposed with respect to the heat exchange block 43 of the heat exchange member 40 in the heat exchanger 30 according to the second exemplary form of the present disclosure, the coolant may be effectively cooled or heated by the thermoelectric elements 31.

Other operations and configurations are the same as or similar to those of the first exemplary form described above.

FIGS. 9 through 12 illustrate a heat exchanger 30 according to a third exemplary form applied to a system for thermally managing a battery of the present disclosure.

The heat exchanger 30 according to the third exemplary form includes a heat exchange member 40 installed in the coolant circulation line 25 to exchange heat with a coolant, a thermoelectric element 31 attached to the heat exchange member 40, a heat sink 32 attached to the thermoelectric element 31, and a cooling fan 33 disposed to face the heat sink 32.

The heat exchange member 40 includes a heat exchange duct 45 connected in the middle of the coolant circulation line 25.

The heat exchange duct 45 has an inlet 45a through which a coolant is introduced and an outlet 45b through which the coolant is discharged, at both end portions thereof, and the inlet 45a and the outlet 45b of the heat exchange duct 45 have a cross-sectional area smaller than that of the heat exchange duct 45. In particular, the inlet 45a and the outlet 45b are connected to one end and the other end of the heat exchange duct 45 by the medium of expansion type connection portions 49, and each of the expansion type connection portions 49 have a tapered structure as illustrated in FIG. 12.

The heat exchange duct 45 is bent to have a U shape such that the inlet 45a and the outlet 45b are positioned in the same direction, and the coolant circulation line 25 is hermetically connected to the inlet 45a and the outlet 45b of the heat exchange duct 45.

As illustrated in FIGS. 11 and 12, a grid frame 47 is installed in an internal flow channel of the heat exchange duct 45, and a plurality of grid flow channels 46 are formed at uniform intervals in vertical and horizontal directions in the grid frame 47. Each of the grid flow channels 46 has a fine circular or quadrangular cross-section. In particular, two grid frames 47 are installed in the internal flow channel adjacent to the inlet 45a of the heat exchange duct 45 and in the internal flow channel adjacent to the outlet 45b of the heat exchange duct 45, respectively.

Accordingly, a coolant introduced through the inlet 45a of the heat exchange duct 45 may pass through the grid flow channels 46 of the two grid frames 47 and is subsequently discharged through the outlet 45b of the heat exchange duct 45. Here, since the coolant may uniformly pass through the grid flow channels 46 having a fine cross-section, the grid flow channels 46 may serve as heat exchange fins increasing a contact area of the coolant, and thus, heat exchange efficiency of the coolant may be increased.

A baffle 48 having a plurality of small through holes 48a is installed in the expansion type connection portion 49. The small through holes 48a of the baffle 48 are formed at uniform intervals, and thus, the inflow and outflow coolant may be uniformly distributed through the small through holes 48a of the baffle 48.

The thermoelectric element 31 may be attached to an upper surface or a lower surface of the heat exchange duct 45, and in particular, a plurality of thermoelectric elements 31 may be uniformly attached to the upper surface or the lower surface of the heat exchange duct 45 to correspond to the U-shaped structure of the heat exchange duct 45.

Through the plurality of thermoelectric elements 31, the coolant passing through the heat exchange duct 45 may be effectively cooled or heated.

Other components are the same as or similar to those of the heat exchanger 30 according to the first and second exemplary forms described above.

According to the present disclosure described above, since the coolant for thermally managing a battery to an appropriate state is cooled or heated by the heat exchanger, the thermal management of the battery may be effectively performed.

Since the coolant heat-exchanged with the battery is cooled or heated by using the Peltier effect of the thermoelectric element, a cooling structure and a heating structure for the battery may be unified, eliminating the necessity of association with a vehicle air-conditioning system, and thus, an overall layout may be very simplified, performance inspection may be simplified, and an overall weight may be effectively reduced.

In addition, since the coolant heat-exchanged with the battery is effectively cooled or heated by using the Peltier effect of the thermoelectric element, cooling and heating efficiency of the battery may be significantly enhanced.

Moreover, since cooling and heating of the battery may be promptly switched by simply changing polarity of power applied to a thermoelectric element according to a temperature of the battery and a temperature of the coolant, controlling thereof may be simplified.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for thermally managing a battery, the system comprising:
   a thermal manager configured to perform thermal management of a battery by a coolant;
   a coolant circulation line being connected to the thermal manager; and
   a heat exchanger being installed to the coolant circulation line,
   wherein the heat exchanger comprises:
      a heat exchange member being installed to the coolant circulation line to cool or heat the coolant,
      a plurality of thermoelectric elements being attached to the heat exchange member, and
      a heat sink being attached to the plurality of thermoelectric elements,
   wherein the heat exchange member comprises:
      a heat exchange duct configured to form an internal flow channel being connected to the coolant circulation line; and
      a grid frame being installed inside the heat exchange duct, and
   wherein the internal flow channel is uniformly divided into a plurality of grid flow channels arranged with a predetermined interval to uniformly flow the coolant through the plurality of grid flow channels.

2. The system according to claim 1, wherein the heat exchange duct comprises an inlet through which the coolant is introduced, and an outlet through which the coolant is discharged, wherein the inlet and outlet are respectively formed at both end portions of the heat exchange duct which includes a structural bent forming a U-shape.

3. The system according to claim 2, wherein the inlet and the outlet of the heat exchange duct include a cross-sectional area smaller than a cross-sectional area of the heat exchange duct, and the inlet and the outlet are connected to a first end and a second end of the heat exchange duct by expansion type connection portions.

4. The system according to claim 3, wherein a baffle having a plurality of small through holes is installed inside the expansion type connection portions.

* * * * *